United States Patent [19]

Iwahara et al.

[11] Patent Number: 4,739,418

[45] Date of Patent: Apr. 19, 1988

[54] INFORMATION SIGNAL RECORDING DISC RECORDED WITH STEREOSCOPIC TELEVISION SIGNAL

[75] Inventors: Makoto Iwahara, Sagamihara; Kiyoaki Suzuki, Zama; Hidetsugu Suzuki; Atsushi Sakamoto, both of Sagamihara, all of Japan

[73] Assignee: Victor Company of Japan, Ltd., Japan

[21] Appl. No.: 840,588

[22] Filed: Mar. 17, 1986

[30] Foreign Application Priority Data

Mar. 20, 1985 [JP] Japan ................................. 60-54677
Mar. 20, 1985 [JP] Japan ................................. 60-54676

[51] Int. Cl.⁴ .......................... H04N 13/00; H04N 5/76
[52] U.S. Cl. ..................................... 358/88; 358/907; 358/342; 358/343; 360/10.1; 360/19.1
[58] Field of Search ................ 358/3, 88, 92, 907, 358/342, 343, 335; 360/10.1, 19.1, 33.1

[56] References Cited

U.S. PATENT DOCUMENTS

| | | |
|---|---|---|
| 4,142,209 | 2/1979 | Hedlund et al. |
| 4,208,671 | 6/1980 | Ozawa ........................... 358/329 |
| 4,286,281 | 8/1981 | Suzuki . |
| 4,353,090 | 10/1982 | Broadbent . |
| 4,402,018 | 8/1983 | Wada et al. |
| 4,423,497 | 12/1983 | Sugiyama et al. |
| 4,429,335 | 1/1984 | Sugiyama et al. |
| 4,510,531 | 4/1985 | Sugiyama . |
| 4,530,013 | 7/1985 | Sugiyama ...................... 358/342 |
| 4,626,930 | 12/1986 | Sugiyama ...................... 358/342 |
| 4,638,376 | 1/1987 | Sugiyama et al. |
| 4,641,178 | 2/1987 | Street ............................... 358/88 |
| 4,649,425 | 3/1987 | Pund ................................ 358/88 |

FOREIGN PATENT DOCUMENTS 6116685 7/1984 Japan .
2016785 9/1979 United Kingdom .
2048547 12/1980 United Kingdom .
2086083 5/1982 United Kingdom .

OTHER PUBLICATIONS

Article Entitled: A Random Access System Adapted for the Optical Videodisc: Its Impact on Information Retrieval.

*Primary Examiner*—Alan Faber
*Attorney, Agent, or Firm*—Andrus, Sceales, Starke & Sawall

[57] ABSTRACT

An information signal recording disc is recorded with a stereoscopic television signal comprising a stereoscopic video signal and audio signals. The disc comprises a spiral track made up of a plurality of track turns, and video signals related to four fields are recorded on each of the plurality of track turns. Each track turn is time-sequentially recorded with right-eye and left-eye video signals of mutually different field numbers out of the right-eye and left-eye video signals of a simultaneous stereoscopic television signal in a sequence of field numbers together with audio signals, so that the right-eye video signal and the left-eye video signal are respectively recorded for a time period of two fields in each track turn. The right-eye and left-eye video signals related to identical fields are recorded side by side to each other in two mutually adjacent track turns. A predetermined sequence with which the right-eye and left-eye video signals are recorded on the spiral track is repeated with a period of eight fields.

7 Claims, 13 Drawing Sheets

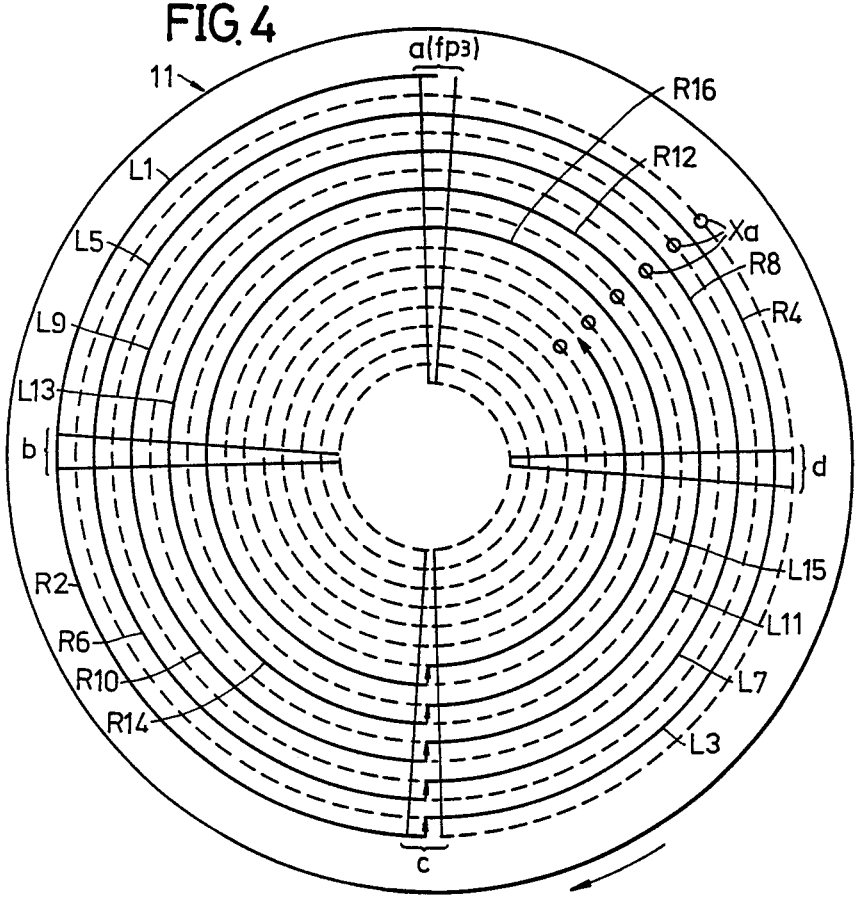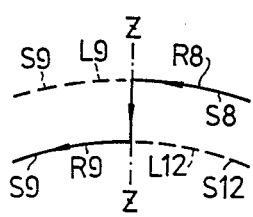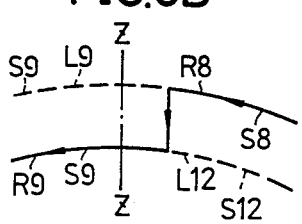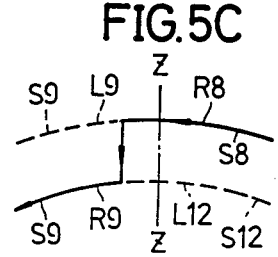

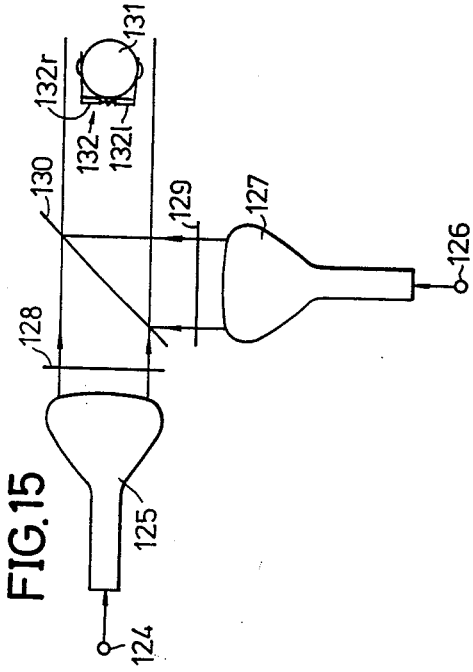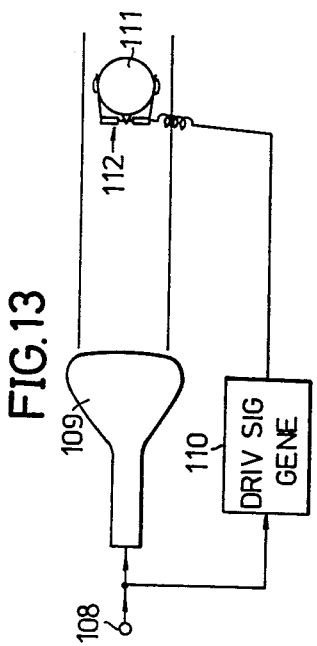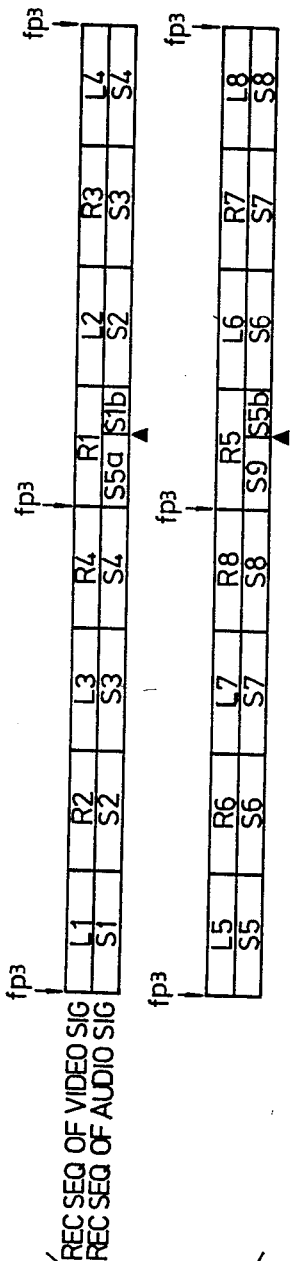

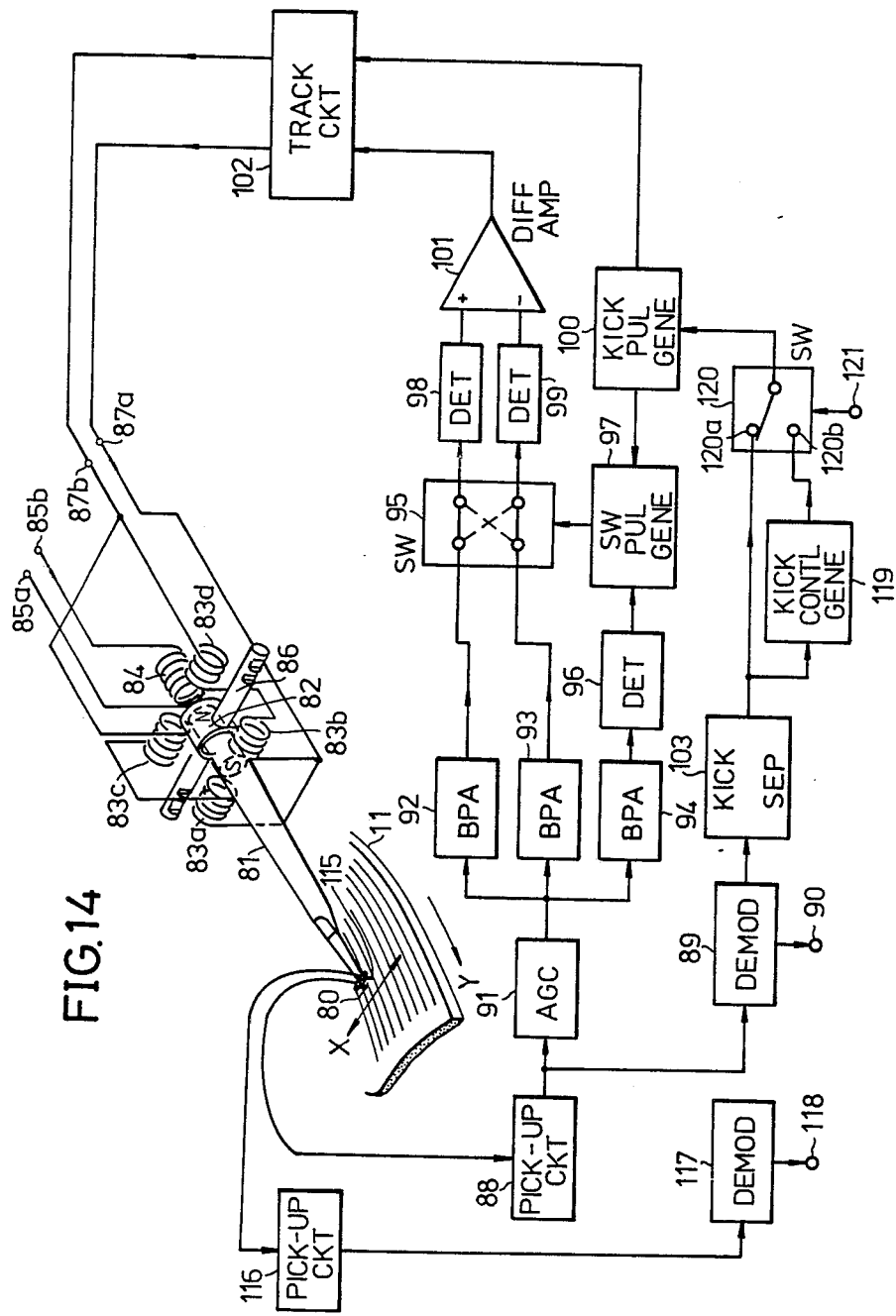

INFORMATION SIGNAL RECORDING DISC RECORDED WITH STEREOSCOPIC TELEVISION SIGNAL

BACKGROUND OF THE INVENTION

The present invention generally relates to information signal recording discs, and more particularly to an information signal recording disc which is recorded with a stereoscopic television signal comprising video signals for obtaining stereoscopic pictures and audio signals.

Various recording and reproducing systems have been reduced to practice for playing various recording mediums such as a video disc recorded with a television signal. A picture which is obtained by reproducing the television signal from the video disc is a two-dimensional picture. However, there is recently a demand for a video disc recorded with a stereoscopic video signal so that a stereoscopic picture can be obtained by reproducing the stereoscopic video signal from the video disc.

As stereoscopic television systems for obtaining the stereoscopic picture, there are basically two existing systems. According to a first system, a right-eye video signal which is to be reproduced and viewed by the right eye of the viewer and a left-eye video signal which is to be reproduced and viewed by the left eye of the viewer are simultaneously reproduced and measures are taken so that the viewer can only see a reproduced right-eye picture with his left eye. On the other hand, according to a second system, the right-eye video signal and the left-eye video signal are alternately reproduced in time sequence with a predetermined period and measures are taken so that the viewer can only see the reproduced right-eye picture with his right eye and can only see the reproduced left-eye picture with his left eye. These first and second systems have been known for more than ten years. However, as is well known, a broadcasting according to such stereoscopic television systems has not been started.

The broadcasting according to the above stereoscopic television systems has not been started mainly for the following reasons. Firstly, in order to maintain compatibility with the existing television braodcasting system which transmits information related to the two-dimensional picture, it is necessary to divide a frequency band which is allocated for the existing television broadcasting system into a frequency band for transmitting the right-eye video signal and a frequency band for transmitting the left-eye video signal, for example. However, in this case, a number of channels which can be used in the television broadcasting system becomes substantially reduced by one-half. Secondly, in the case where the frequency bands of the right-eye and left-eye video signals are compressed, the television broadcasting system itself becomes quite different from the existing television broadcasting system and it is difficult to reduce such a different system into practice. Thirdly, in the case of the second system described before according to which the right-eye and left-eye video signals are alternately transmitted in time sequence, there is a problem in that the right-eye and left-eye video signals will be reproduced as a double image on a normal television receiver.

On the other hand, the problem of allocating the channels in the stereoscopic television broadcasting system will not occur when recording the stereoscopic video signal on the video disc. Hence, the stereoscopic television system which is used to record the stereoscopic video signal on the video disc can be selected with a large degree of freedom, and there is certainly a significance in recording the stereoscopic video signal on the video disc.

However, it is desirable that the video disc recorded with the stereoscopic video signal is playable on an existing video disc player and that it is possible to to satisfactorily reproduce the normal two-dimensional picture and the normal sound. In addition, it is desirable that the video disc recorded with the stereoscopic video signal is playable on a video disc player employing the first system described before in which the right-eye and left-eye video signals of a simultaneous stereoscopic video signal are reproduced simultaneously, and that this video disc is also playable on a video disc player employing the second system described before in which the right-eye and left-eye video signals of a sequential stereoscopic video signal are alternately reproduced in time sequence.

Accordingly, an information signal recording disc was previously proposed in a Japanese Patent Application No. 59-137701 in which the applicant is the same as the assignee of the present application. This previously proposed disc is primarily designed so that the existing video disc player can reproduce from the disc the stereoscopic picture and also the normal two-dimensional picture. For this reason, when reproducing from the disc the sequential stereoscopic video signal of the second system, a reproducing element must be shifted from one track turn to another track turn on the disc a large number of times. As a result, there is a problem in that audio signals recorded on the disc may not be reproduced satisfactorily. In other words, even when the forced shift of the reproducing element is performed within a vertical blanking period of the video signal, the signals reproduced from the disc at the instant when the reproducing element is shifted become distorted, and the audio signals reproduced from the disc are distorted every time the reproducing element is shifted.

On the other hand, it is desirable that a stereoscopic picture is reproduced from the video disc when the video disc is played on the video disc player and the reproducing element scans over a scanning locus identical to that at the time of a double-speed quick motion reproducing mode. In this case, it is possible to apply the video disc player for a wide range of use.

SUMMARY OF THE INVENTION

Accordingly, it is a general object of the present invention to provide a novel and useful information signal recording disc which is recorded with a stereoscopic television signal, in which the problems and demands described before are respectively eliminated and satisfied.

Another and more specific object of the present invention is to provide an information signal recording disc in which a right-eye video signal and a left-eye video signal of mutually different field numbers out of the right-eye and left-eye video signals of a simultaneous stereoscopic television signal are respectively time-sequentially recorded in a sequence of the field numbers for a time period of two fields in each track turn, where each track turn comprises four shields, and a predetermined sequence with which the right-eye and left-eye video signals are recorded together with audio signals of the simultaneous stereoscopic television signal is repeated with a period of eight fields so that the right-eye and left-eye video signals of identical field numbers are recorded side by side on two mutually adjacent track turns. According to the information signal recording disc of the present invention, it is possible to selectively reproduce from the disc a normal television signal for obtaining a two-dimensional picture, the simultaneous stereoscopic television signal for obtaining a stereoscopic picture according to the first system and a sequential stereoscopic television signal for obtaining a stereoscopic picture according to the second system. Furthermore, since it is possible to reduce the number of times a reproducing element must be shifted from one track turn to another track turn when reproducing the sequential stereoscopic television signal for obtaining a stereoscopic picture according to the second system, it is possible to reproduce the audio signals satisfactorily when reproducing the sequential stereoscopic television signal.

Still another object of the present invention is to provide an information signal recording disc in which a predetermined sequence with which a right-eye video signal and a left-eye video signal of a stereoscopic television signal are recorded is repeated with a period of eight fields, and the predetermined sequence is such that one of the right-eye and left-eye video signals is recorded for a time period of one field, the other of the right-eye and left-eye video signals is recorded for a time period of two fields, the one video signal is recorded for a time period of one field, the other video signal is recorded for a time period of one field, the one video signal is recorded for a time period of two fields and the other video signal is recorded for a time period of one field. According to the information signal recording disc of the present invention, it is possible to reproduce from the disc a sequential stereoscopic television signal for obtaining a stereoscopic picture according to the second system by making a reproducing element scan over a scanning locus identical to that at the time of a double-speed quick motion reproducing mode of an existing video disc player. Hence, it is possible to reproduce from the disc the sequential stereoscopic television signal on the existing video disc player which is originally not intended to reproduce the sequential stereoscopic television signal so as to obtain the stereoscopic picture.

A further object of the present invention is to provide an information signal recording disc in which first and second kick instruction signals are recorded within predetermined vertical blanking periods which occur for every four fields. According to the information signal recording disc of the present invention, it is possible to automatically reproduce one of a right-eye video signal and a left-eye video signal of a stereoscopic television signal when the disc is played on an existing video disc player. In addition, even when a reproducing element starts to erroneously scan a wrong track turn, the pre-recorded first and second kick instruction signals are used to control the reproducing element so as to scan a correct track turn, and it is therefore possible to satisfactorily reproduce the video signal and obtain a two-dimensional picture.

Another object of the present invention is to provide an information signal recording disc in which positions where audio signals become discontinuous are selected at predetermined positions on the disc. According to the information signal recording disc of the present invention, the audio signals are recorded so that the audio signals are reproduced satisfactorily even when a reproducing element is shifted abnormally in a reproducing mode of the video disc player. For this reason, even when there is an inconsistency in a response speed of the reproducing element among video disc players and there are differences in actual shifting positions of the reproducing element among the video disc players, or when the reproducing element does not correctly reproduce a kick instruction signal, it is possible to reproduce the audio signals without deteriorating the reproducing states thereof.

Other objects and further features of the present invention will be apparent from the following detailed description when read in conjunction with the accompanying drawings.

BRIEF DESCRIPTION OF THE DRAWINGS

FIG. 4 shows a scanning locus of the reproducing element when obtaining a sequential stereoscopic picture from the disc shown in FIG. 1;

FIGS. 5A through 5C respectively are diagrams for explaining reproducing states of audio signals when the reproducing element is shited from one track turn to another track turn on the disc;

FIG. 13 is a diagram showing an embodiment of an arrangement when a stereoscopic picture is obtained from an output reproduced video signal of the block system shown in FIG. 12;

FIG. 14 is a system block diagram showing a second embodiment of the reproducing apparatus for playing the information signal recording disc according to the present invention;

FIG. 15 is a diagram showing an embodiment of an arrangement when a stereoscopic picture is obtained from an output reproduced video signal of the block system shown in FIG. 14; and FIG. 16 is a diagram for explaining another embodiment of the recording pattern on the information signal recording disc according to the present invention.

DETAILED DESCRIPTION

Figure 1:
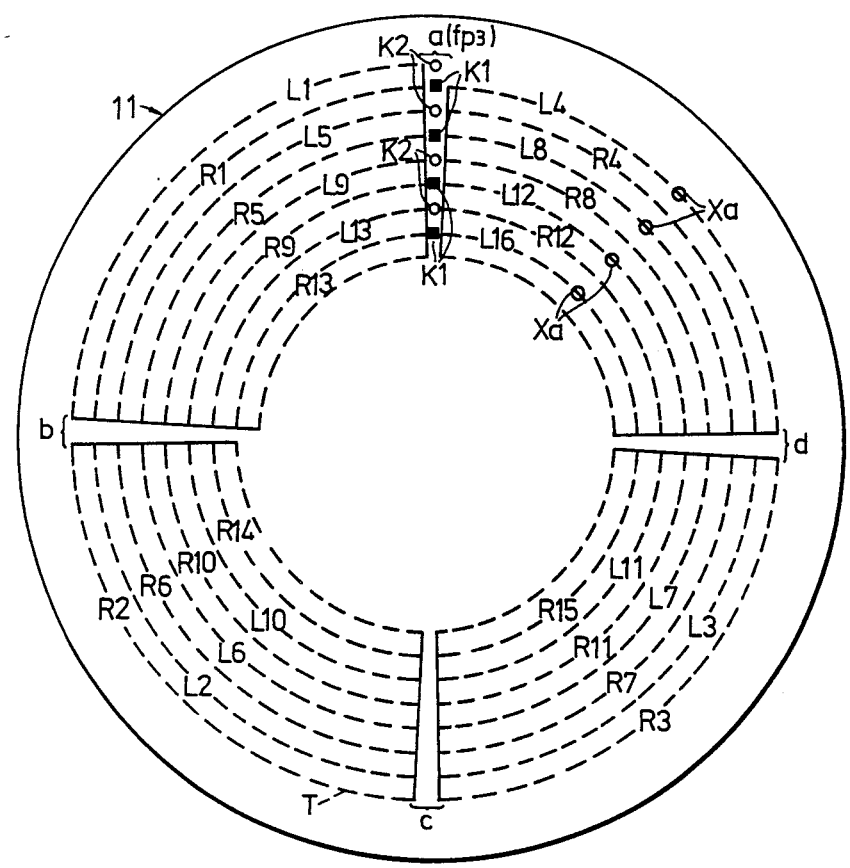
FIG. 1 is a plan view showing an embodiment of a recording pattern on the information signal recording disc according to the present invention.

In FIG. 1, a stereoscopic television signal is recorded on a single spiral track T on an information signal recording disc (hereinafter simply referred to as a video disc) 11. The stereoscopic television signal comprises a stereoscopic video signal and audio signals. The spiral track T is formed from an outer periphery to an inner periphery of the video disc 11. For example, the stereoscopic television signal is recorded in a form of a frequency modulated signal as disclosed in a U.S. Pat. No. 4,208,671 in which the assignee is the same as the assignee of the present application. The frequency modulated signal is obtained by limiting a frequency band of a luminance signal, frequency-converting a carrier chrominance signal into a low frequency range, band-share-multiplexing the band limited luminance signal and the frequency converted carrier chrominance signal so as to obtain a band share multiplexed signal, and frequency-modulating a carrier by the band share multiplexed signal. An address signal is multiplexed in a specific interval within a vertical blanking period of the band share multiplexed signal.

The stereoscopic video signal is recorded together with the audio signals on the video disc 11 with the signal format described above at a rate of four fields in one track turn. The video disc 11 is rotated at a constant rotational speed. Accordingly, in each track turn of the video disc 11, there are four portions (hereinafter referred to as vertical blanking period portions) a, b, c and d corresponding to the vertical blanking periods as shown in FIG. 1, and these vertical blanking period portions a, b, c and d are arranged at equi-angular intervals.

As disclosed in the U.S. Pat. No. 4,208,671 described before, first and second reference signals fp1 and fp2 for tracking control are alternately recorded on subtracks formed in an approximate intermediate portion between center lines of the track turns of the spiral track T so that the sides on which the first and second reference signals fp1 and fp2 are recorded with respect to one track turn is interchanged for every one revolution period of the video disc 11. The first and second reference signals fp1 and fp2 have mutually different frequencies in a frequency range lower than a frequency range of the frequency modulated signal described before. In FIG. 1, the illustration of the subtracks is omitted for convenience' sake. A third reference signal fp3 is recorded for a predetermined time period on the spiral track T at positions in accordance with the interchanging positions of the first and second reference signals fp1 and fp2. The third reference signal fp3 is recorded within the vertical blanking period portion a.

Figure 2:
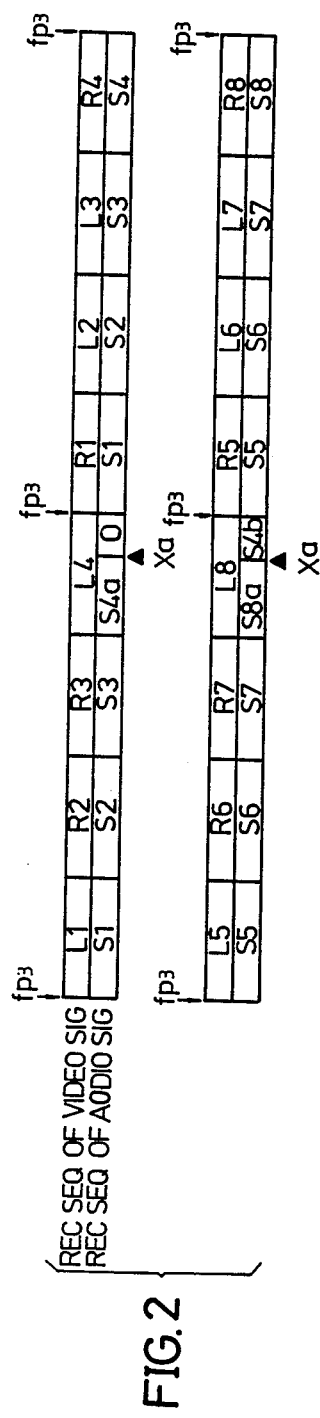
FIG. 2 is a diagram for explaining the recording pattern on the disc shown in FIG. 1.

In FIG. 1 and the drawings which will be described later on in the specification, R denotes a right-eye video signal of the stereoscopic video signal, L denotes a left-eye video signal of the stereoscopic video signal, and numerical subscripts of R and L respectively indicate field numbers of the respective video signals. Hence, as shown in FIGS. 1 and 2, a predetermined sequence with which the right-eye and left-eye video signals of the stereoscopic video signal are recorded on the spiral track T is repeated with a period of eight fields by taking the recorded position of the third reference signal fp3 as a starting point, and the predetermined sequence is such that the left-eye video signal is recorded for a time period of one field, the right-eye video signal is recorded for a time period of two fields, the left-eye video signal is recorded for a time period of one field, the right-eye video signal is recorded for a time period of one field, the left-eye video signal is recorded for a time period of two fields and the right-eye video signal is recorded for a time period of one field.

The stereoscopic television signal is a simultaneous stereoscopic television signal of the first system described before. Hence, the stereoscopic television signal comprises the right-eye and left-eye video signals respectively related to each field. As may be seen from FIG. 1, the right-eye and left-eye video signals related to identical fields are recorded side by side on two mutually adjacent track turns for identical angular ranges on the video disc 11 from each of the recorded positions of the third reference signal fp3.

A first kick instruction signal k1 is recorded on each track turn having one field of the left-eye video signal recorded immediately after the vertical blanking period portion a thereof. A second kick instruction signal k2 is recorded on each track turn having one field of the right-eye video signal recorded immediately after the vertical blanking period portion a thereof. The first and second kick instruction signals k1 and k2 are respectively recorded within the vertical blanking period portion, and recorded positions of the first and second kick instruction signals k1 and k2 are respectively indicated black rectangular marks and circles in FIG. 1.

The first kick instruction signal k1 is recorded to forcibly shift (that is, to kick) a reproducing element in a backward direction by one track pitch within the vertical blanking period portion b which occurs one field after the vertical blanking period portion a in which the first kick instruction signal k1 is recorded, and kick the reproducing element in a forward direction by one track pitch within the vertical blanking period portions d and a which respectively occur three and four fields after the vertical blanking period portion a in which the first kick instruction signal k1 is recorded. In the case of the video disc 11 shown in FIG. 1, the forward direction corresponds to an inner peripheral direction of the video disc 11 and the backward direction corresponds to an outer peipheral direction of the video disc 11. One track pitch is a distance between the center lines of two mutually adjacent track turns. On the other hand, the second kick instruction signal k2 is recorded to kick the reproducing element in the inner peripheral direction of the video disc 11 by one track pitch within the vertical blanking period portions d and a which respectively occur three and four fields after the vertical blanking period portion 1 in which the second kick instruction signal k2 is recorded.

As will be described later, a reproducing apparatus which plays the video disc 11 is designed so that the reproducing element is kicked immediately after a vertical synchronizing signal is reproduced at a kicking position which is located before recorded positions of the first and second kick instruction signals k1 and k2 and an address signal along a general scanning direction.

As will be described later, the first and second kick instruction signals k1 and k2 are used in the case where a two-dimensional reproduced picture is to be obtained from the video disc 11. In this case, even when the reproducing element runs off a correct scanning locus due to some cause, the reproducing element can be quickly controlled so as to scan along the correct scanning locus by use of the first and second kick instruction signals k1 and k2.

The audio signals are recorded on the spiral track T in correspondence with the stereoscopic video signal. The recorded audio signals are indicated by S1, S2, ... in FIG. 2. In FIG. 2, S denotes the audio signals and numerical subscripts of S respectively indicate the field numbers of the video signals to which the audio signals are related. The stereoscopic video signal comprises the right-eye and left-eye video signals and there are two kinds of video signals as described before, however, the audio signals related to identical fields of the two kinds of video signals are the same. Accordingly, audio signals S1 related to the left-eye video signal L1 are the same as the audio signals S1 related to the right-eye video signal R1, for example. In FIG. 2, "0" denotes a silent interval.

In each of every other track turns in FIG. 1, the field numbers of the video signals respectively recorded for a time period of one field before and after the vertical blanking period portion a are not in sequence, but the field numbers of the video signals recorded on other track turns are in sequence. Accordingly, the audio signals become discontinuous only within the vertical blanking period portion a in each of the every other track turns.

As will be described later, when reproducing the video signal so as to obtain the two-dimensional reproduced picture, the reproducing element is kicked within the vertical blanking period portion a by one track pitch from one track turn in which the field numbers are in sequence to another track turn in which the field numbers are not in sequence with the field numbers of the one track turn. For example, when it is assumed that first and second discontinuous positions of the audio signals in first and second track turns respectively lie on an imaginary line Z—Z as shown in FIGS. 5A through 5C, where the recorded video signals change from the right-eye video signal R8 of the field number "8" to the left-eye video signal L9 of the field number "9" at the first discontinuous position of the audio signals in the first track turn and the recorded video signals change from the left-eye video signal L12 of the field number "12" to the right-eye video signal R9 of the same field number "9" at the second discontinuous position of the audio signals in the second track turn, the reproducing element is kicked by one track pitch from the first track turn to the second track turn as indicated by solid lines when obtaining the two-dimensional reproduced picture.

As described before, the kicking position of the reproducing element is within the vertical blanking period portion and is within a range of approximately 11H from a position where the recorded vertical synchronizing signal terminates to a position where the recorded address signal, the first kick instruction signal k1 or the second kick instruction signal k2 starts, where H denotes one horizontal scanning period. However, the actual kicking position itself is slightly different among reproducing apparatuses.

Accordingly, the reproducing element is normally kicked on the line Z—Z as indicated by the solid line FIG. 5A, but depending on the reproducing apparatus, the reproducing element is actually kicked immediately before or after the line Z—Z as indicated by the solid lines in FIGS. 5B and 5C. In the case shown in FIG. 5C wherein the reproducing element is kicked immediately after the line Z—Z which corresponds to the discontinuous positions of the audio signals, the audio signals can be reproduced satisfactorily as in the case shown in FIG. 5A because identical audio signals S9 are recorded on the two mutually adjacent track turns between which the reproducing element is kicked.

However, in the case shown in FIG. 5B wherein the reproducing element is kicked immediately before the line Z—Z, different audio signals are recorded on the two mutually adjacent track turns between which the reproducing element is kicked. In other words, the audio signals S8 recorded on the first track turn which is scanned by the reproducing element before the kick and the audio signals S12 recorded on the second track turn which is scanned after the kick are different. As a result, the audio signals S8, S12 and S9 are reproduced in this sequence and the audio signals are not reproduced in a correct sequence. During a short time period in which the audio signals S12 are reproduced, the reproduced sound will only sound as noise.

Hence, in the present embodiment, at least a terminal portion of a track turn part corresponding to one field immediately before the vertical blanking period portion a where the field number of the video signal becomes discontinuous (that is, the vertical blanking period portion in which the third reference signal fp3 is recorded), is recorded with audio signals identical to the audio signals recorded four fields before as shown in FIG. 2.

In FIG. 2, S4$b$ denotes a latter part of the audio signals S4 which are recorded four fields before. Further, S4$a$ and S8$a$ respectively denote first parts of the audio signals S4 and S8. Thus, in the present embodiment, the positions (editing points) where the audio signals become discontinuous are indicated by Xa in FIG. 1 and indicated by black triangular marks in FIG. 2. The discontinuous position Xa of the audio signals may be located at an arbitrary position which is within a track turn part corresponding to one field immediately before the vertical blanking period portion a.

Next, description will be given with respect to each reproducing mode for the video disc 11. The video disc 11 is selectively played in one of three reproducing modes. The three reproducing modes are a two-dimensional picture reproducing mode in which only the right-eye video signal is reproduced in the sequence of the field numbers together with the audio signals, a sequential stereoscopic picture reproducing mode in which the right-eye and left-eye video signals are alternately reproduced in the sequence of the field numbers for every one field together with the audio signals, and a simultaneous stereoscopic picture reproducing mode in which right-eye and left-eye video signals of identical fields are simultaneously reproduced in the sequence of the field numbers together with the audio signals.

Figure 3:
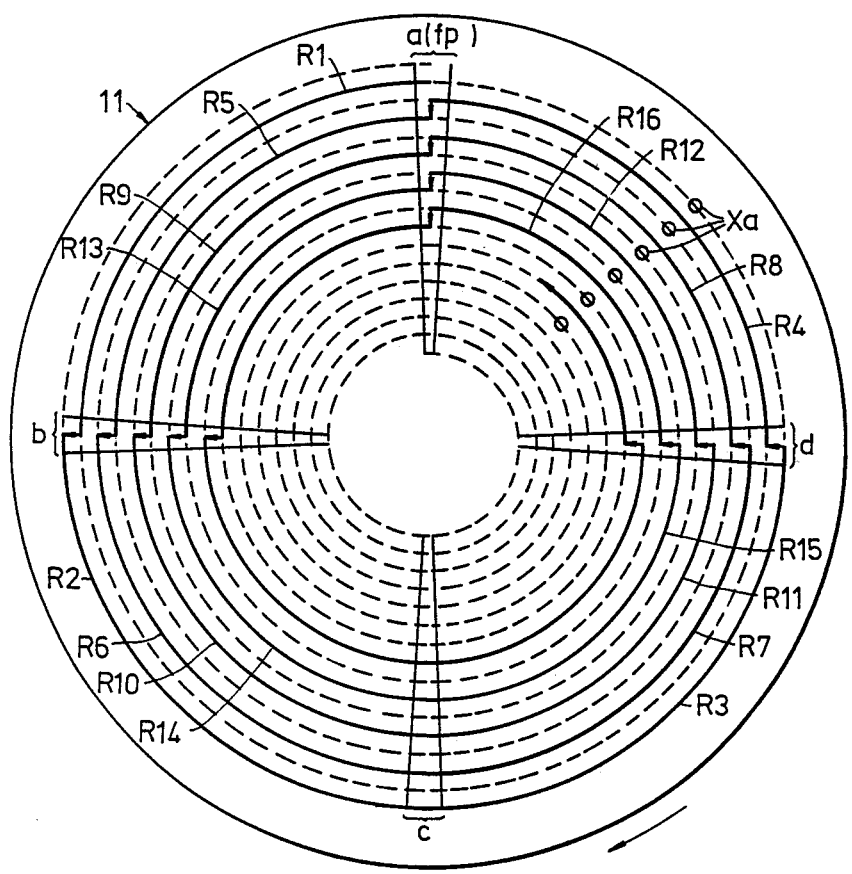
FIG. 3 shows a scanning locus of a reproducing element when obtaining a two-dimensional picture from the disc shown in FIG. 1.

In the two-dimensional picture reproducing mode, the reproducing element scans along such a scanning locus that the reproducing element is kicked by one track pitch in the inner peripheral direction within the vertical blanking period portions a and d and is kicked by one track pitch in the outer peripheral direction within the vertical blanking period portion b as indicated by a solid line in FIG. 3. The reproducing element scans along this scanning locus based on the reproduced kick instruction signal k1. In the case where the kick instruction signal k1 is not reproduced, the kick instruction signal k2 is reproduced, and thus, the reproducing element is controlled based on the reproduced kick instruction signal k2 so that the kick instruction signal k1 is reproduced from the next track turn. As a result, only the right-eye video signals R1, R2, R3, R4, ... are reproduced from the video disc 11 in the sequence of the field numbers, and the two-dimensional picture is obtained.

On the other hand, in the sequential stereoscopic picture reproducing mode, the reproducing element scans along such a scanning locus that the reproducing element is kicked by one track pitch in the inner peripheral direction only within the vertical blanking period portion c as indicated by a solid line in FIG. 4. In this reproducing mode, a kick control of the reproducing element based directly on the kick instruction signals k1 and k2 is not performed, but the scanning locus of the reproducing element is selected so as to reproduce the kick instruction signal k2. As a result, the right-eye and left-eye video signals are alternately reproduced for every one field, that is, the left-eye and right-eye video signals L1, R2, L3, R4, L5, ... are reproduced from the video disc 11 in the sequence of the field numbers, and the sequential stereoscopic picture is obtained. The scanning locus of the reproducing element in this mode is identical to a scanning locus of the reproducing element in a double speed quick motion reproducing mode of an existing reproducing apparatus. For this reason, it is possible to obtain the sequential stereoscopic picture by playing the video disc 11 on the existing reproducing apparatus in the double speed quick motion reproducing mode, without having to use a special adapter.

In the simultaneous stereoscopic picture reproducing mode, two reproducing elements independently but simultaneously scan two track turns which are mutually separated by one track pitch, for example. The two reproducing elements scan along wuch scanning loci that the two reproducing elements are respectively kicked by one track pitch in the inner peripheral direction every time the two reproducing elements reach the respective vertical blanking period portions a. As a result, the right-eye and left-eye video signals of identical fields are simultaneously reproduced from the video disc 11 in the sequence of the field numbers, and the simultaneous stereoscopic picture is obtained. In this reproducing mode, one of the two reproducing elements scans the editing point Xa described before, but the other reproducing element does not scan the editing point Xa. Hence, the reproducing apparatus is designed so that the reproduced audio signals are only obtained from the reproducing element which does not scan the editing point Xa.

Figure 6:
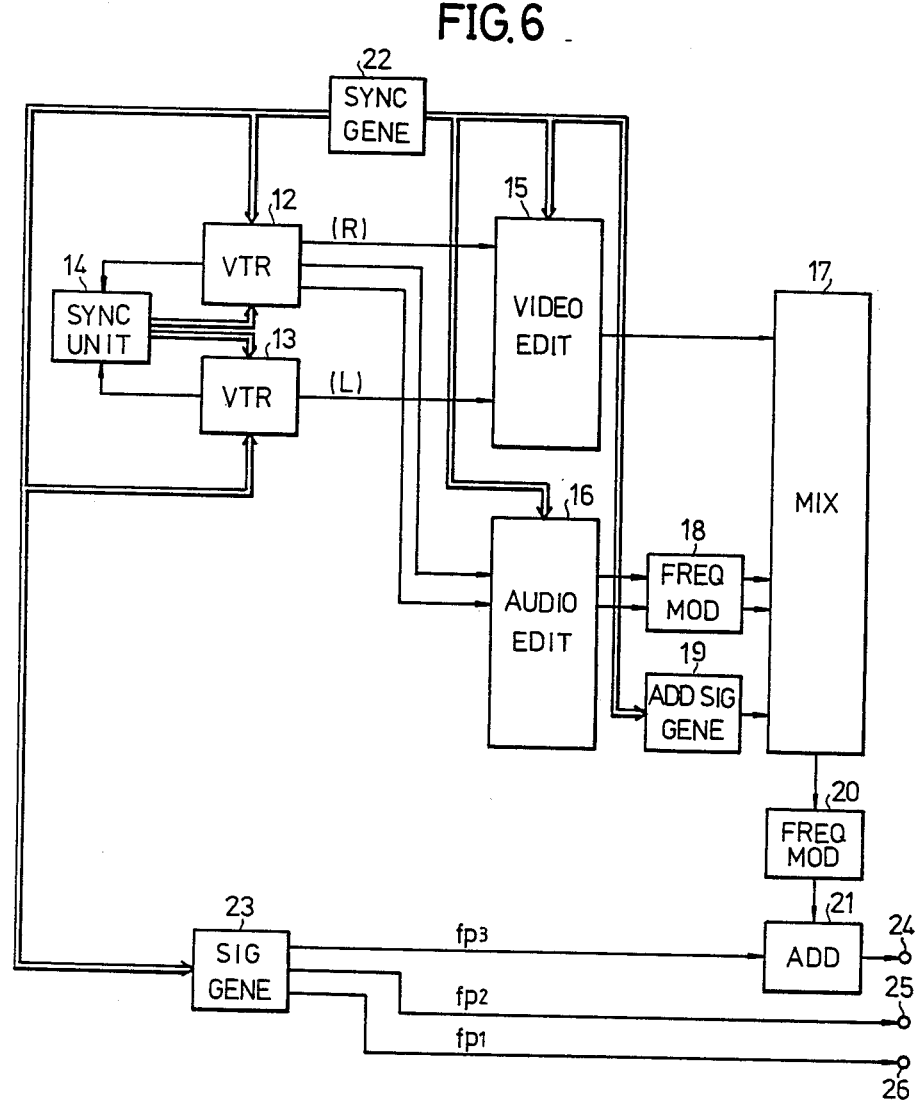
FIG. 6 is a system block diagram showing an embodiment of a recording apparatus for recording information signals on the information signal recording disc according to the present invention.

Next, description will be given with respect to a recording system for recording the disc according to the present invention, by referring to FIGS. 6 through 11. In FIG. 6, a first video tape recorder (hereinafter simply referred to as a VTR) 12 plays a magnetic tape which is pre-recorded with the right-eye video signal and two-channel audio signals of the simultaneous stereoscopic television signal. On the other hand, a second VTR 13 plays a magnetic tape which is pre-recorded with the left-eye video signal of the simultaneous stereoscopic television signal. Furthermore, the VTRs 12 and 13 reproduce from the respective magnetic tapes time codes which indicate absolute addresses on the magnetic tapes, and the reproduced time codes are supplied to a synchronizing unit 14. The synchronizing unit 14 operates the VTRs 12 and 13 in synchronism with each other based on the reproduced time codes.

The VTRs 12 and 13 play the magnetic tapes in a one-half speed slow motion reproducing mode, and supplies the reproduced video signals to a video editing apparatus 15. The first VTR 12 supplies to an audio editing apparatus 16 the reproduced audio signals in which the time base is expanded by two times due to the one-half speed slow motion reproduction.

Figure 7:
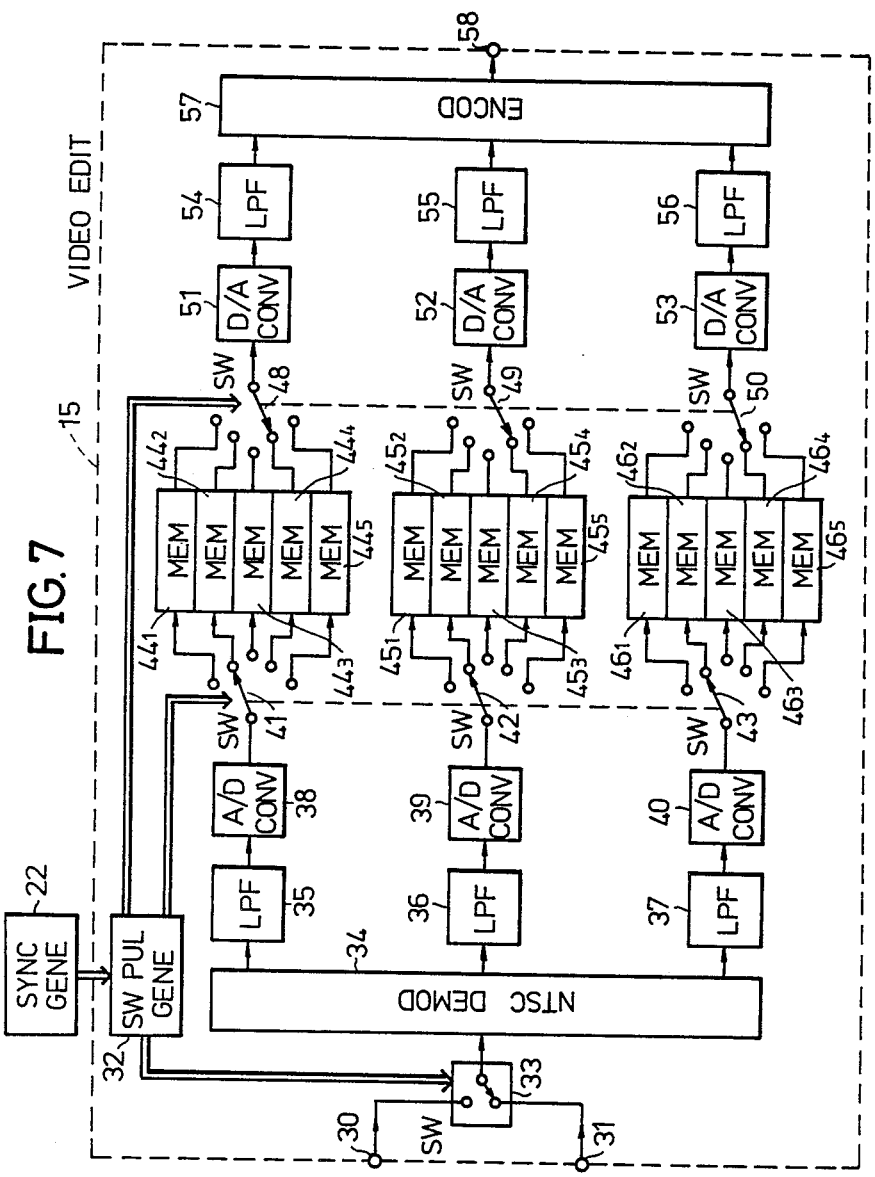
FIG. 7 is a system block diagram showing an embodiment of an essential part of the block system shown in FIG. 6.
Figure 8:
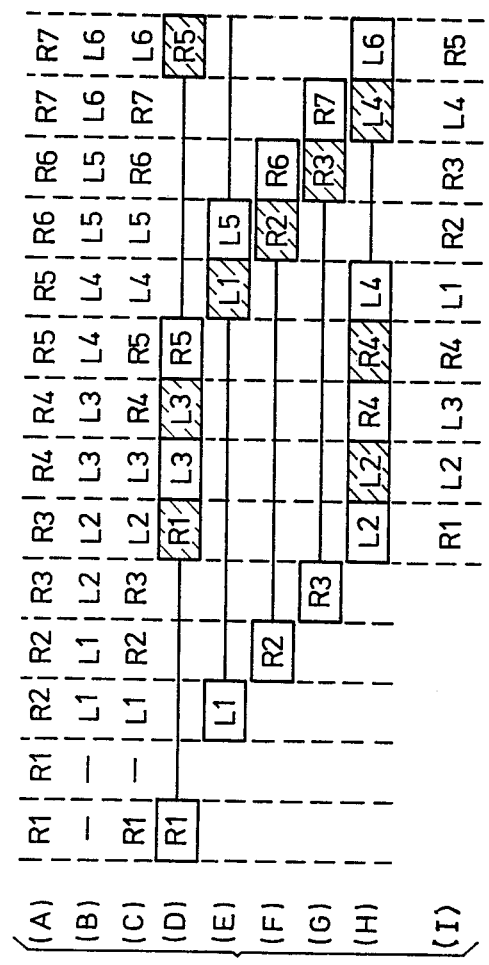
FIGS. 8(A) through 8(I) respectively are diagrams for explaining the operation of the block systems shown in FIGS. 6 and 7.

The video editing apparatus 15 has a construction shown in FIG. 7. In FIG. 7, the reproduced right-eye video signal from the first VTR 12 is aplied to an input terminal 30. Since the first VTR 12 plays the magnetic tape in the one-half speed slow motion reproducing mode, each field is reproduced twice, and the reproduced right-eye video signal is applied to the input terminal 30 in a sequence R1, R1, R2, R2, R3, ... for every one field as shown schematically in FIG. 8(A). On the other hand, the reproduced left-eye video signal from the second VTR 13 is applied to an input terminal 31. Because the second VTR 13 also plays the magnetic tape in the one-half speed slow motion reproducing mode, each field is reproduced twice, and the reproduced left-eye video signal is applied to the input terminal 31 in a sequence L1, L1, L2, L2, L3, ... for every one field as shown schematically in FIG. 8(B). As may be seen from FIGS. 8(A) and 8(B), the left-eye video signal is applied to the input terminal 31 with a time delay of two fields with respect to the right-eye video signal applied to the input terminal 30.

Based on a vertical synchronizing signal within synchronizing signals obtained from a synchronizing signal generator 22, a switching pulse generator 32 shown in FIG. 7 generates a switching pulse signal which has a predetermined period and supplies this switching pulse signal to a switching circuit (multiplexer) 33. Hence, the switching circuit 33 selectively passes the right-eye or left-eye video signal in a sequence shown schematically in FIG. 8(C), and the output video signal of the switching circuit 33 is supplied to an NTSC demodulator 34.

Because the input right-eye or left-eye video signal of the NTSC demodulator 34 is an NTSC system color video signal, the NTSC demodulator 34 demodulates the incoming video signal into three primary color signals of red (R), blue (B) and green (G). The NTSC demodulator 34 may be designed to demodulate the incoming video signal into a luminance signal and two kinds of color difference signals.

The three primary color signals obtained from the NTSC demodulator 34 are independently passed through respective lowpass filters 35, 36 and 37 for eliminating aliasing noise, and are independently supplied to respective analog-to-digital (A/D) converters 38, 39 and 40 wherein the signals are converted into digital signals. The output digital signals of the A/D converters 38, 39 and 40 are independently supplied to respective switching circuits 41, 42 and 43. The switching circuits 41 through 43 are respectively switched and controlled by a switching pulse signal from the switching pulse generator 32. An output digital signal of the switching circuit 41 is supplied to one of field memories $44_1$ through $44_5$, an output digital signal of the switching circuit 42 is supplied to one of field memories $45_1$ through $45_5$, and an output digital signal of the switching circuit 43 is supplied to one of field memories $46_1$ through $46_5$.

The field memories $44_1$ through $44_5$, the field memories $45_1$ through $45_5$ and the field memories $46_1$ through $46_5$ respectively perform the same operation. In other words, as shown in FIG. 8(D), the primary color signals related to the right-eye video signal R1 are first supplied to the respective field memories $44_1$, $45_1$ and $46_1$. Then, two fields thereafter, the primary color signals related to the left-eye video signal L1 are supplied to the respective field memories $44_2$, $45_2$ and $46_2$ as shown in FIG. 8(E). One field thereafter, the primary color signals related to the right-eye video signal R2 are supplied to the respective field memories $44_3$, $45_3$ and $46_3$ as shown in FIG. 8(F). One field thereafter, the primary color signals related to the right-eye video signal R3 are supplied to the respective field memories $44_4$, $45_4$ and $46_4$ as shown in FIG. 8(G). Further, one field thereafter, the primary color signals related to the left-eye video signal L2 are supplied to the respective field memories $44_4$, $45_5$ and $46_5$ as shown in FIG. 8(H).

In FIGS. 8(D) through 8(H), R1, L1, R2, ... respectively indicate time periods of one field in which the primary color signals related to the identified video signal are written into the field memories. In addition, R1, L1, R2, ... with hatchings respectively indicate time periods of one field in which the primary color signals related to the identified video signal are read out from the field memories. Accordingly, as shown in FIG. 8(D), the field memories $44_1$, $45_1$ and $46_1$ write therein the respective primary color signals related to the right-eye video signal in a time period of one field, and read out the respective stored primary color signals after a time period of five fields. Immediately after reading out the above respective stored primary color signals, the field memories $44_1$, $45_1$ and $46_1$ write therein the respective primary color signals related to the left-eye video signal in a time period of one field, and read out the respective stored primary color signals in a next time period of one field as shown in FIG. 8(D). These write-in and read-out operations are repeated.

As shown in FIGS. 8(E), 8(F) and 8(G), the field memories $44_2$ through $44_4$, $45_2$ through $45_4$ and $46_2$ through $46_4$ respectively write therein the corresponding primary color signal in a time period of one field, and read out the stored primary color signal after a time period of seven fields, and these operations are repeated. Furthermore, as shown in FIG. 8(H), the field memories $44_5$, $45_5$ and $46_5$ respectively write therein the input primary color signal during the time period of one field in which the field memories $44_1$, $45_1$ and $46_1$ respectively perform the read-out operation. Then, as shown in FIG. 8(H), the field memories $44_5$, $45_5$ and $46_5$ respectively perform the write-in operation and the read-out operation alternately for a time period of five fields, then perform the read-out operation after a time period of three fields, and these operations are repeated.

Accordingly, the field memories $44_1$ through $46_5$ respectively perform the write-in and read-out with a predetermined sequence which is repeated with a period of eight fields. The primary color signals read out from the field mmeories $44_1$ through $44_5$ are passed through a switching circuit 48, and an output primary color signal of the switching circuit 48 is supplied to a digital-to-analog (D/A) converter 51. Similarly, the primary color signals read out from the field memories $45_1$ through $45_5$ are passed through a switching circuit 49, and an output primary color signal of the switching circuit 49 is supplied to a D/A converter 52. The primary color signals read out from the field memories $46_1$ through $46_5$ are passed through a switching circuit 50, and an output primary color signal of the switching circuit 50 is supplied to a D/A converter 53. The read out primary color signals are respectively converted back into the analog signals in the D/A converters 51 through 53. The switching circuits 48 through 50 are respectively switched and controlled by a switching pulse signal from the switching pulse generator 32. The switching circuits 48 through 50 selectively pass the read out primary color signals with a predetermined sequence shown schematically in FIG. 8(I) which is repeated with a period of eight fields. The analog primary color signals obtained from the D/A converters 51 through 53 are passed through respective lowpass filters 54 through 56 and are supplied to an encoder 57 wherein the signals are converted into the band share multiplexed signal comprising the band limited luminance signal and the frequency converted carrier chrominance signal, for example. The band share multiplexed signal from the encoder 57 is outputted via an output terminal 58 and is supplied to a mixer 17 shown in FIG. 6.

Figure 9:
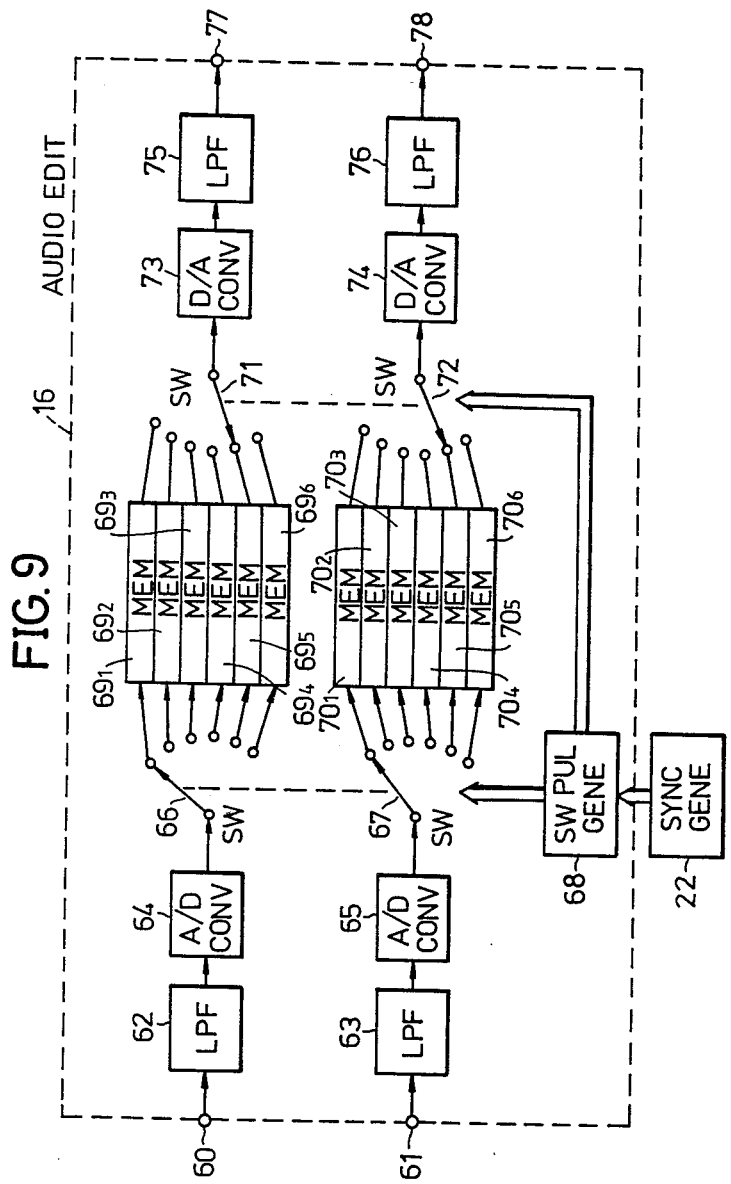
FIG. 9 is a system block diagram showing an embodiment of another essential part of the block system shown in FIG. 6.

Next, description will be given with respect to the construction and operation of the audio editing apparatus 16, by referring to FIGS. 9 and 10. In FIG. 9, the two-channel audio signals from the first VTR 12, shown schematically in FIGS. 10(B) and 10(C), are supplied to respective input terminals 60 and 61. As described before, the first VTR 12 plays the magnetic tape in the one-half speed slow motion reproducing mode and reproduces the right-eye video signal in the sequence shown in FIG. 10(A) wherein each field is reproduced twice. In other words, in the case of a helical scan type VTR, each oblique track formed obliquely to a longitudinal direction of the magnetic tape is scanned twice by a rotary magnetic head. However, a relative speed between the rotary magnetic head and the magnetic tape in the one-half speed slow motion reproducing mode is approximately the same as that in a normal reproducing mode, and the time base of the reproduced right-eye video signal does not change.

On the other hand, the two-channel audio signals are reproduced by stationary magnetic heads from two parallel tracks which are formed in the longitudinal direction of the magnetic tape. In the one-half speed slow motion reproducing mode, the moving speed of the magnetic tape is reduced by one-half that at the time of the normal reproducing mode. Hence, in the one-half speed slow motion reproducing mode, reproduced audio signals in which the time base is expanded by two times are obtained from the stationary magnetic heads.

Figure 10:
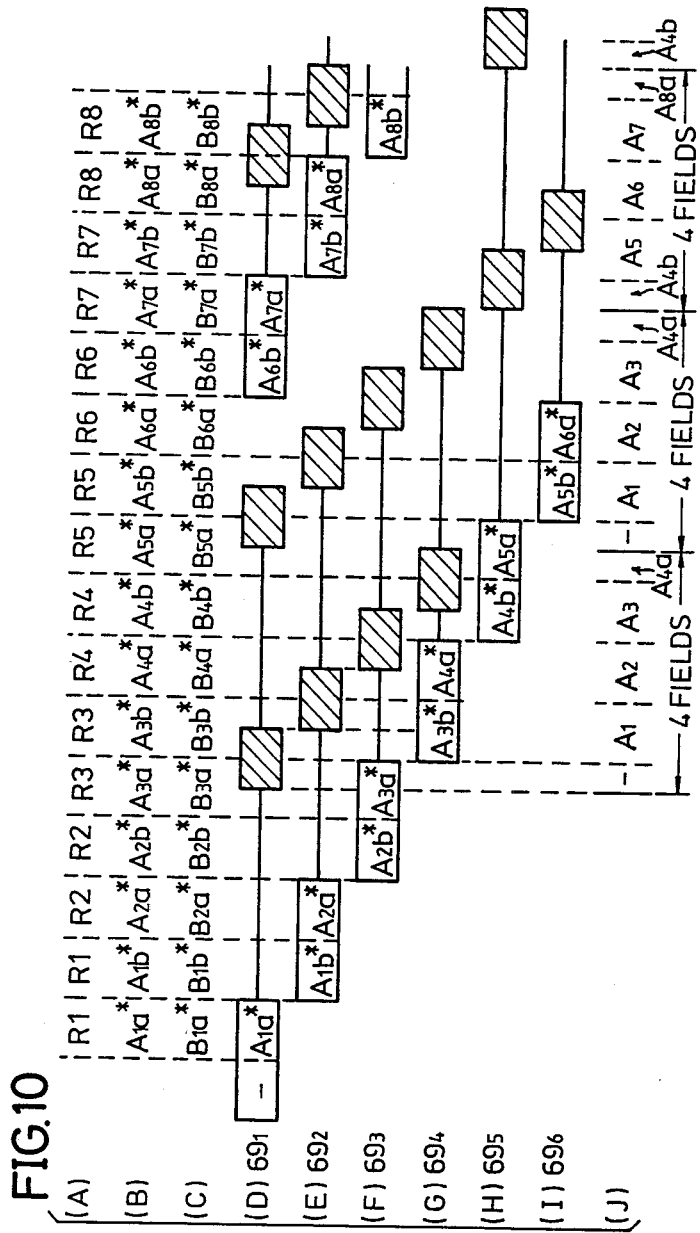
FIGS. 10(A) through 10(J) respectively are diagrams for explaining the operation of the block system shown in FIG. 9.
Figure 11:
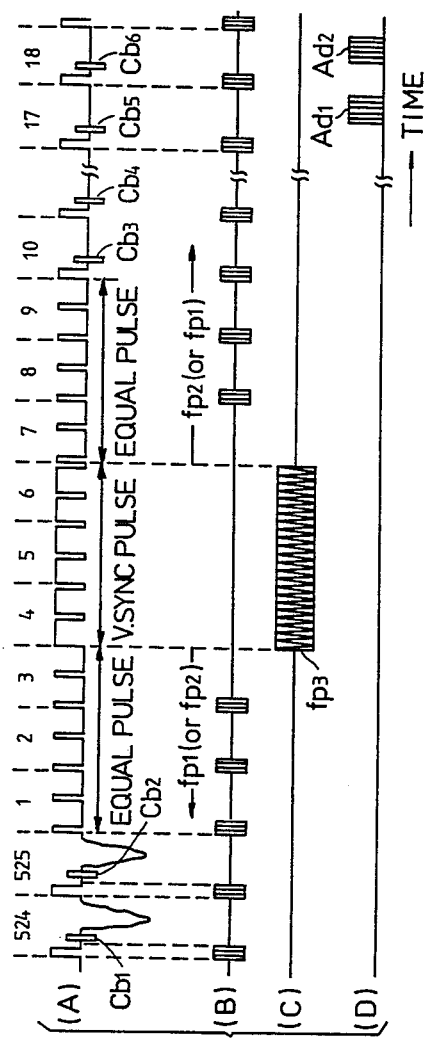
FIGS. 11(A) through 11(D) respectively show signal waveforms of signals recorded by the block system shown in FIG. 6.

In FIG. 10, A and B respectively denote the two-channel audio signals. The numerical subscripts of A and B respectively indicate the field numbers of the video signals to which the audio signal are related. The subscript "a" of A and B indicates that the audio signal is related to the video signal in a first half of the field number identified by the numerical subscript. Similarly, the subscript "b" of A and B indicates that the audio signal is related to the video signal in a latter half of the field number identified by the numerical subscript. Further, the asterisk "*" added to A and B indicates that the time base of the audio signal is expanded by two times.

The two-channel audio signals applied to the terminals 60 and 61 are passed through respective lowpass filters 62 and 63 and are supplied to respective A/D converters 64 and 65. For example, the A/D converters 64 and 65 respectively sample the audio signals at a sampling frequency of 24 kHz, quantize and convert the sampled signals into digital audio signals. The two-channel digital audio signals from the A/D converters 64 and 65 are passed through respective switching circuits 66 and 67 and are respectively supplied to one of memories $69_1$ through $69_6$ and one of memories $70_1$ through $70_6$. The switching circuits 66 and 67 are linked to each other and are switched and controlled by a switching pulse signal from a switching pulse generator 68. Switching circuits 71 and 72 which will be described later are also linked to each other and are switched and controlled by a switching pulse signal from the switching pulse generator 68.

The write-in and read-out operations of the memories $69_1$ through $69_6$ are the same as those of the memories $70_1$ through $70_6$, and thus, description will only be given with respect to the write-in and read-out operations of the memories $69_1$ through $69_6$. The time base expanded digital audio signal from the A/D converter 66 is supplied to the switching circuit 66 which selectively supplies the time base expanded digital audio signal to the memories $69_1$ through $69_6$ for every two fields in a sequence of the memories $69_1, 69_2, 69_3, \ldots, 69_6, 69_1, \ldots$. However, a time base expanded digital audio signal A1$a$* related to a first time period of one field is supplied to the memory $69_1$, and thereafter, the time base expanded digital audio signals of the subsequent time periods of one field are successively supplied to the memories $69_2$ through $69_6$ and $69_1$ for every two fields.

FIG. 10(D) schematically shows the write-in and read-out operations of the memory $69_1$. Similarly, FIGS. 10(E), 10(F), 10(G), 10(H) and 10(I) schematically show the write-in and read-out operations of the memories $69_2$, $69_3$, $69_4$, $69_5$ and $69_6$, respectively. In FIGS. 10(D) through 10(I), portions with hatchings indicate time periods of one field in which the read-out operation is performed. And, for example, A2$a$* indicates a time period of one field in which the time base expanded digital audio signal A2$a$* is written. The memories $69_1$ through $69_6$ respectively write therein for a time period of two fields the incoming time base expanded digital audio signal which exists for the time period of two fields and read out therefrom the stored time base expanded digital audio signal in a time period of one field. In other words, the time base of the digital audio signals read out from the memories $69_1$ through $69_6$ is compressed by one-half. Since the memories $69_1$ through $69_6$ store the time base expanded digital audio signals in which the time base is expanded by two times the original time base, the digital audio signals in which the time base is returned to the original time base are read out from the memories $69_1$ through $69_6$ due to the time base compression by one-half. The memories $69_1$ through $69_6$ respectively perform the operation of reading out in the time period of one field all of the time base expanded digital audio signal which is written for the time period of two fields, and this operation is performed twice with an interval of three fields.

The switching circuit 71 selectively passes the output digital audio signal of one of the memories $69_1$ through $69_6$ which is performing the read-out operation. Hence, in the latter half of the of the first time period of one field (that is, in a time period of 0.5 field), the switching circuit 71 passes the output digital audio signal A1$a$ of the memory $69_1$. During the next time period of one field, the switching circuit 71 selectively and successively passes the output digital audio signals A1$b$ and A2$a$ of the memory $69_2$ for every time period of 0.5 field. Further, during the next time period of one field, the switching circuit 71 selectively and successively passes the output digital audio signals A2$b$ and A3$a$ of the memory $69_3$ for every time period of 0.5 field.

As described before, the digital audio signals A1$a$ and A1$b$ respectively are the first and latter halves of the digital audio signal A1 related to the video signal of the field number "1", and correspond to the time period of 0.5 field. Hence, when the digital audio signals A1$a$ and A1$b$ are successively outputted, it is the same as if the digital audio signal A1 is outputted. Similarly, the first and latter halves of the digital audio signals related to the video signals of other field numbers and respectively corresponding to the time period of 0.5 field are successively obtained from two different memories out of the memories $69_1$ through $69_6$, so that the digital audio signals are read out with the original sequence.

As a result, the digital audio signals are outputted from the switching circuit 71 in the sequence schematically shown in FIG. 10(J). The recording of the video disc 11 is started with the digital audio signal A1, and the time period of one field in which the digital audio signal A1 is outputted is identical to the time period of one field in which the right-eye video signal R3 is reproduced in the first VTR 12 as shown in FIG. 10(A). However, as may be seen from FIGS. 8(A) and 8(I), the time period of one field in which the right-eye video signal R3 is reproduced in the first VTR 12 is identical to the time period of one field in which the right-eye video signal R1 is first recorded on the video disc 11.

The first-channel digital audio signal obtained from the switching circuit 71 is supplied to a D/A converter 73 wherein the digital audio signal is subjected to a D/A conversion based on a clock pulse signal having a frequency of 48 kHz. An output first-channel analog audio signal of the D/A converter 73 is passed through a lowpass filter 75 wherein a high frequency component is eliminated, and is outputted via an output terminal 77. Similarly, the second-channel digital audio signal is obtained from the switching circuit 72. This second-channel digital audio signal can be described by the schematic sequence shown in FIG. 10(J) by changing A to B. The second-channel digital audio signal is converted into a second-channel analog audio signal in a D/A converter 74 and is passed through a lowpass filter 76 wherein a high frequency component is eliminated. The second-channel analog audio signal is outputted via an output terminal 78.

Returning now to the description of FIG. 6, the two-channel analog audio signals from the output terminals 77 and 78 of the audio editing apparatus 16 are supplied to a frequency modulator 18. The two-channel analog audio signals independently frequency-modulate two carriers having mutually different frequencies (for example, 3.43 MHz and 3.73 MHz), and two-channel frequency modulated (FM) audio signals are obtained from the frequency modulator 18 and are supplied to the mixer 17.

An adding signal generator 19 is supplied with an output signal of the synchronizing signal generator 22, and generates various adding signals such as the kick instruction signals k1 and k2 and the address signals which are to be multiplexed within the vertical blanking period of the video signal which is recorded. The adding signals from the adding signal generator 19 are supplied to the mixer 17.

The mixer 17 obtains a multiplexed signal by multiplexing the adding signals shown in FIG. 11(D) from the adding signal generator 19 at specific positions within the vertical blanking period of the color video signal (band share multiplexed signal of the luminance signal and the frequency converted carrier chrominance signal) shown in FIG. 11(A) which is obtained from the video editing apparatus 15. Furthermore, the mixer 17 frequency-division-multiplexes the above multiplexed signal and the two-channel FM audio signals from the frequency modulator 18, so as to obtain a frequency division multiplexed signal. This frequency division multiplexed signal from the mixer 17 is supplied to a frequency modulator 20 to frequency-modulate a carrier having a frequency in the order of 7 MHz, and an output frequency modulated (FM) frequency division multiplexed signal of the frequency modulator 20 is supplied to an adder 21.

A signal generator 23 is supplied with a composite synchronizing signal and a chrominance subcarrier from the synchronizing signal generator 22, and generates with predetermined timings the first, second and third reference signals fp1, fp2 and fp3 which have mutually different frequencies which are obtained by frequency-dividing the subcarrier frequency of the frequency converted carrier chrominance signal described before. As shown in FIG. 11(B), the first and second reference signals fp1 and fp2 are burst signals outputted within the horizontal blanking period of the color video signal (band share multiplexed signal of the luminance signal and the frequency converted carrier chrominance signal) within the frequency division multiplexed signal which is outputted from the mixer 17, and in order not to introduce undesirable effects on a color burst signal, the first and second reference signals fp1 and fp2 are outputted within a time period avoiding the color burst signal. Thus, the first and second reference signals fp1 and fp2 are alternately outputted via output terminals 25 and 26 for every one revolution period of the video disc 11.

In the case where the color video signal which is obtained from the mixer 17 and is to be recorded on the video disc 11 employs the system having 525 scanning lines, the color video signal has a waveform shown in FIG. 11(A) wherein numerals above the waveform indicate horizontal scanning line numbers and Cb1 through Cb7 denote color burst signals. The third reference signal fp3 is generated from the signal generator 23 during a time period of approximately 3H corresponding to a duration of the vertical synchronizing pulses of the color video signal in one revolution period of the video disc 11 as shown in FIG. 11(C). The third reference signal fp3 is supplied to the adder 21.

The adder 21 adds the FM frequency division multiplexed signal from the frequency modulator 20 and the third reference signal fp3 from the signal generator 23, and supplies an added signal to an output terminal 24. The signals from the output terminals 24 through 26 are supplied to a optical recording system (not shown). An optical recording system disclosed in a U.S. Pat. No. 4,208,671 in which the assignee is the same as the assignee of the present application may be used as the optical recording system which receives the signals from the output terminals 24 through 26.

That is, the added signal (information signal) from the output terminal 24 is supplied to a light modulator (not shown), for example, so as to modulate a laser beam and obtain a modulated laser beam. The modulated laser beam in converged on a photosensitive agent coated on a surface of a recording original disc (not shown), and known developing processes are performed to form the spiral track T which comprises rows of intermittent pits on the recording original disc in accordance with a repetition frequency of the main information signal. Hence, the video and audio signals are simultaneously recorded on the spiral track T. The first and second reference signals fp1 and fp2 from the ouput terminals 25 and 26 are supplied to another light modulator (not shown) to similarly modulate another laser beam and obtain another modulated laser beam. This other modulated laser beam is used to form on the recording original disc the subtracks which comprise rows of intermittent pits, simultaneously as the formation of the spiral track T. The video disc 11 having the brush pattern shown in FIG. 1 is produced from the recording original disc by performing known disc producing processes.

Figure 12:
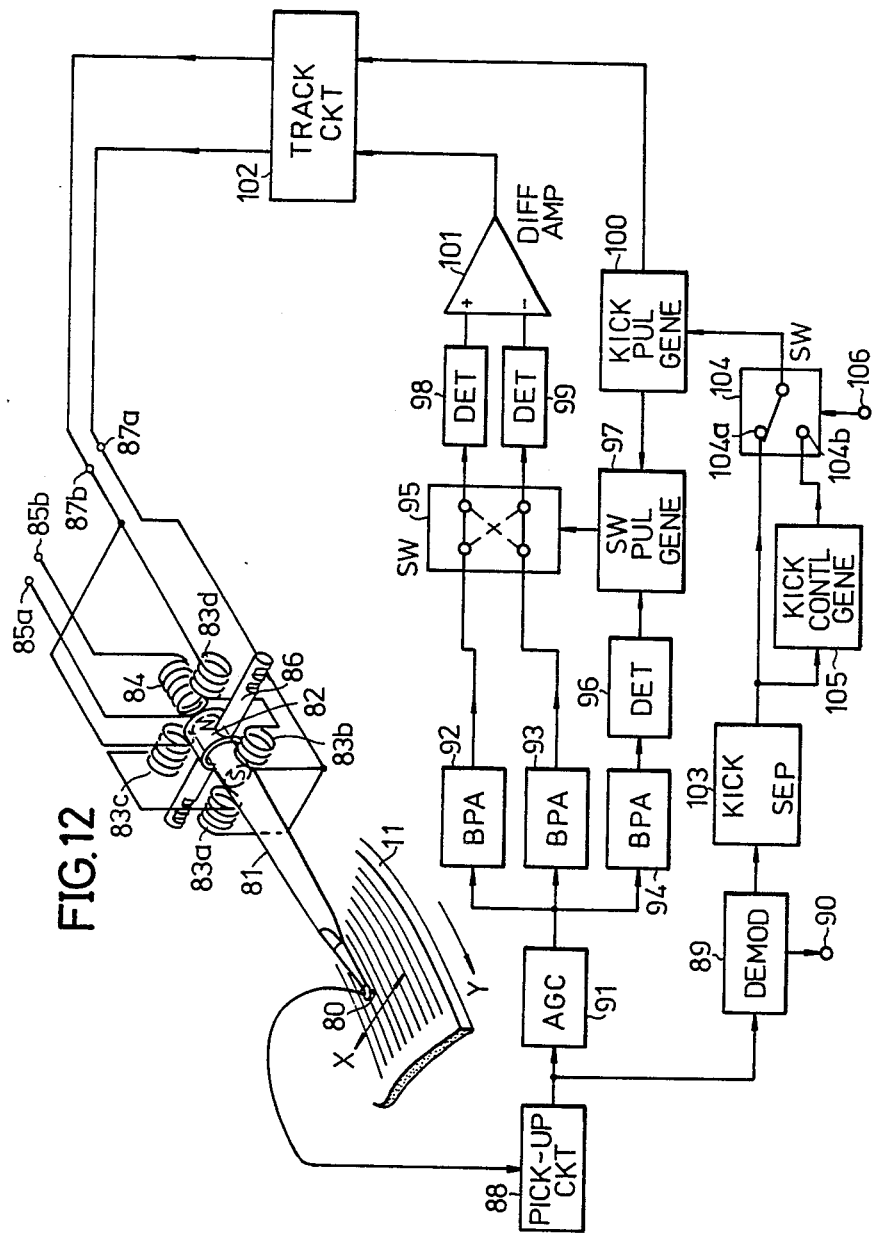
FIG. 12 is a system block diagram showing a first embodiment of a reproducing apparatus for playing the information signal recording disc according to the present invention.

Next, description will be given with respect to the reproducing apparatus for playing the video disc 11 and reproducing the recorded signals from the video disc 11. FIG. 12 is a system block diagram showing a first embodiment, the reproducing apparatus is designed to selectively reproduce from the video disc 11 the normal television signal for obtaining the two-dimensional picture and the sequential stereoscopic television signal for obtaining the sequential stereoscopic picture.

In FIG. 12, the video disc 11 is rotated in a direction Y at a rotational speed of approximately 900 revolutions per minute (rpm). A reproducing stylus 80 makes sliding contact with the video disc 11 to scan the signal track T.

The reproducing stylus 80 is fixed to a tip end of a cantilever 81, and a permanent magnet 82 is fixed to a base end of the cantilever 81. The cantilever 81 is supported by a suspension 86 made of rubber. Tracking coils 83a, 83b, 83c and 83d and a jitter compensation coil 84 which are fixed to the reproducing apparatus surround the base portion of the cantilever 81 where the permanent magnet 82 is fixed. The jitter compensation coil 84 generates an attractive or repulsive force with respect to the permanent magnet 82 responsive to polarities of jitter compensation signals applied to input terminals 85a and 85b, so as to displace the cantilever 81 in a direction tangent to the spiral track T on the video disc 11. Hence, a jitter caused by a surface oscillation on the video disc 11 or eccentricity of the video disc 11 is positively compensated.

The tracking coils 83a through 83d displace the cantilever 81 in one of directions X (that is, in a width direction of the track) responsive to polarities of tracking error signals applied to input terminals 87a and 87b by a quantity responsive to levels of the tracking error signals.

A pick-up circuit 88 generally comprises first through fourth circuits. The first circuit is a resonance circuit in which a resonance frequency changes responsive to a change in an electrostatic capacitance which is formed between an electrode deposited on a rear surface of the reproducing stylus 80 and the video disc 11. The electrostatically capacitance changes depending on the rows of intermittent pits formed on the video disc 11, as is well known. The second circuit applies a signal having a constant frequency to the resonance circuit. The amplitude of a high-frequency signal obtained from the resonance circuit changes depending on the change in the electrostatic capacitance, and the third circuit detects the amplitude of the output high-frequency signal of the resonance circuit. The fourth circuit per-amplifies the amplitude detected high-frequency signal (reproduced signal) from the third circuit. The high-frequency reproduced signal from the pick-up circuit 88 is supplied to a demodulating circuit 89. The demodulating circuit 89 demodulates the main information signal (the right-eye or left-eye video signal and the audio signals) reproduced from the spiral track T and supplies the demodulated main information signal to an output terminal 90. A pair of the reproduced high-frequency signal from the pick-up circuit 88 is passed through an automatic gain control (AGC) circuit 91 and is supplied to bandpass amplifiers 92, 93 and 94. The bandpass amplifiers 92 and 93 have characteristics for frequency-selecting and amplifying the first and second reference signals pf1 and pf2, respectively. The first and second reference signals fp1 and fp2 obtained from the bandpass amplifiers 92 and 93 are respectively applied to first and second input teminals of a gate switching circuit 95. The bandpass amplifier 94 has a characteristic for frequencyselecting and amplifying the third reference signal fp3. The third reference signal fp3 obtained from the bandpass amplifier 94 is supplied to an envelope detection circuit 96 which detects the envelope of the third reference signal fp3 and generates an envelope detection signal. The envelope detection circuit 96 is designed so as to generate the envelope detection signal by itself when the third reference signal fp3 is not reproduced due to a dropout or the like. The output envelope detection signal of the envelope detection circuit 96 is supplied to a switching pulse generator 97.

The gate switching circuit 95 is switched and controlled by a switching pulse signal generated from the switching pulse generator 97. For example, during a high-level period of the switching pulse signal, the first input terminal of the gate switching circuit 95 is coupled to an input terminal of a detection circuit 98 and the second input terminal of the gate switching circuit 95 is coupled to an input terminal of a detection circuit 99. On the other hand, during a low-level period of the switching pulse signal, the first input terminal of the gate switching circuit 95 is coupled to the input terminal of the detection circuit 99 and the second input terminal of the gate switching circuit 95 is coupled to the input terminal of the detection circuit 98.

The polarity of the switching pulse signal generated from the switching pulse generator 97 is inverted when the switching pulse generator 97 receives the envelope detection signal from the enevelope detection circuit 96 or a kick pulse signal (excluding a kick pulse signal received within the time period in which the third reference signal fp3 is reproduced) from a kick pulse generator 100 which will be described later. As a result, the envelope detection signal of the reference signal reproduced from the subtract on the outer side of the track turn which is to be reproduced is obtained from the detection circuit 98, and the envelope detection signal of the reference signal reproduced from the subtract on the inner side of the track turn which is to be reproduced is obtained from the detection circuit 99. Output signals of the detection circuits 98 and 99 are supplied to a differential amplifier 101. A tracking error signal having a polarity in accordance with the direction of the tracking error and having a level in accordance with the quantity of the tracking error is outputted from the differential amplifier 101. This tracking errror signal from the differential amplifier 101 is supplied to a tracking circuit 102 which applies the tracking error signals to the terminals 97a and 97b. Hence, currents are applied to the tracking coils 83a through 83d and a force is accordingly applied to the cantilever 81 so as to urge the cantilever in one of the directions X. Therefore, the reproducing stylus 80 is displaced in a direction by a quantity so as to reduce the tracking error to zero, and thus, the reproducing stylus 80 accurately scans the spiral track T.

A kick instruction signal separating circuit 103 separates the kick instruction signals k1 and k2 from the output demodulated signal of the demodulating circuit 89. The separated kick instruction signals k1 and k2 are supplied to a terminal 104a of a switching circuit 104 and to a kick control signal generator 105.

A mode designating signal is applied to a terminal 106. The switching circuit 104 is connected to the terminal 104a in the two-dimensional picture reproducing mode and is connected to a terminal 104b in the sequential stereoscopic picture reproducing mode. Accordingly, in the two-dimensional picture reproducing mode, the reproduced kick instruction signal k1 or k2 is passed through the switching circuit 104 and is supplied to the kick pulse generator 100. When the first kick instruction signal k1 is supplied to the kick pulse generator 100, the kick pulse generator 100 successively generates kick pulses for kicking the reproducing stylus 80 by one track pitch in the outer peripheral direction after approximately one field from the time when the first kick instruction signal k1 is received (that is, reproduced) and for kicking the reproducing stylus 80 by one track pitch in the inner peripheral direction after approximately three fields and after approximately four fields from the time when the first kick instruction signal k1 is received. When the second kick instruction signal is supplied to the kick pulse generator 100, the kick pulse generator 100 successively generates kick pulses for kicking the reproducing stylus 80 by one track pitch in the outer peripheral direction after approximately three fields and after approximately four fields from the time when the second kick instruction signal k2 is received.

Accordingly, the reproducing stylus 80 scans along the scanning locus indicated by the solid line in FIG. 3, and only the reproduced right-eye video signal is supplied from the demodulating circuit 89 to the output terminal 90.

On the other hand, in the sequential stereoscopic picture reproducing mode, the output signal of the kick control signal generator 105 is passed through the switching circuit 104 and is supplied to the kick pulse generator 100. The first and second kick instruction signals k1 and k2 are recorded at predetermined parts on the video disc 11 as described before, and for this reason, it is possible to detect whether the reproducing stylus 80 will next reproduce the right-eye or left-eye video signal depending on which of the first and second kick instruction signals k1 and k2 is reproduced. Hence, it can be detected that the reproducing stylus 80 will next reproduce the left-eye video signal when the second kick instruction signal k2 is supplied to the kick control signal generator 105, and in this case, the kick control signal generator 105 generates such a kick control signal that the kick pulse generator 100 generates kick pulses for kicking the reproducing stylus 80 by one track pitch in the inner peripheral direction after approximately two fields from the time when the kick control signal is received by the kick pulse generator 100. As a result, the reproducing stylus 80 is kicked by one track pitch in the inner peripheral direction within the vertical blanking period portion c of the video disc 11 shown in FIG. 1.

When the first kick instruction signal k1 is supplied to the kick control signal generator 105, it can be detected that the reproducing stylus 80 will next reproduce the right-eye video signal. In this case, the kick control signal generator 105 generates such a kick control signal that the kick pulse generator 100 generates kick pulses for kicking the reproducing stylus 80 by one track pitch in the inner peripheral direction after approximately one field and after approximately two fields from the time when the kick control signal is received by the kick pulse generator 100. As a result, the reproducing stylus 80 is kicked by one track pitch in the inner peripheral direction within the vertical blanking period portion b and c of the video disc 11 shown in FIG. 1.

Therefore, the reproducing stylus 80 scans along the scanning locus indicated by the solid line in FIG. 4. Even if the reproducing stylus 80 should not kick at a position where the kick must occur or the reproducing stylus 80 should kick at a position where the kick must not occur and the first kick instruction signal k1 is reproduced, the reproducing stylus 80 is kicked one field thereafter within the vertical blanking period portion b and the scanning locus of the reproducing stylus 80 is returned to the correct scanning locus indicated by the solid line in FIG. 4.

Excluding a an initial time period of one field from the time when the first kick instruction signal k1 is reproduced in which initial time period the video signal is incorrectly reproduced, the right-eye and left-eye video signals are thereafter alternately reproduced in the sequence of the field numbers for every one field. The reproduced video signal from the demodulating circuit 89 is supplied to a monitoring receiver (not shown) via the output terminal 90. The reproduced video signal is passed through a known signal processing circuit (not shown) within the monitoring receiver and is applied to a picture tube 109 and a driving signal generating circuit 110 via a terminal 108. The driving signal generating circuit 110 supplies a driving signal to shutter glasses 112 worn by a viewer 111 so as to alternately open and close right-eye and left-eye shutters of the shutter glasses 112 for every one field. Accordingly, the left-eye shutter of the shutter glasses 112 is open and the right-eye shutter of the glasses 112 is closed when the picture of the left-eye video signal is reproduced on the picture tube 109. During the next time period of one field when the picture of the right-eye video signal is reproduced on the picture tube 109, the left-eye shutter is closed and the right-eye shutter is open. Therefore, the viewer 111 views the known sequential stereoscopic picture through the shutter glasses 112.

Next, description will be given with respect to a second embodiment of the reproducing apparatus for playing the video disc 11, by referring to FIGS. 14 and 15. In FIG. 14, those parts which are the same as those corresponding parts in FIG. 12 are designated by the same reference numerals, and description thereof will be omitted. In FIG. 14, the cantilever 81 comprises on the tip end thereof a reproducing stylus 115 which is arranged side by side to the reproducing stylus 80 with a separation of one track pitch. With respect to the video disc 11, the reproducing stylus 115 is arranged on the outer peripheral direction from the reproducing stylus 80. The two reproducing styli 80 and 115 simultaneously scan two mutually adjacent track turns on the video disc 11. The signal reproduced from the track turn scanned by the reproducing stylus 115 is obtained through a pick-up circuit 116 having a construction identical to that of the pick-up circuit 88. The reproduced signal from the pick-up circuit 116 is demodulated in a demodulating circuit 117 and is supplied to an output terminal 118.

A mode designating signal is applied to a terminal 121, and a switching circuit 120 is connected to a terminal 120a in the two-dimensional picture reproducing mode and is connected to a terminal 12b in the simultaneous stereoscopic picture reproducing mode. Hence, the output signal of the kick instruction signal separating circuit 103 is supplied to the kick pulse generator 100 via the switching circuit 120 in the two-dimensional picture reproducing mode, and an output signal of a kick control signal generator 119 is supplied to the kick pulse generator 100 via the switching circuit 120 in the simultaneous stereoscopic picture reproducing mode.

The kick control signal generator 119 is supplied with the kick instruction signal k1 or k2 which is separated from the signal reproduced by the reproducing stylus 80 which is arranged on the inner side out of the two reproducing styli 80 and 115. When the first kick instruction signal k1 is supplied to the kick control signal generator 119, the kick control signal generator 119 generates such a kick control signal that the kick pulse generator 100 generates kick pulses for kicking the reproducing styli 80 and 115 by one track pitch in the inner peripheral direction after approximately four fields from the time when the kick control signal is received by the kick pulse generator 100. In other words, the kick pulse generator 100 generates kick pulses for kicking the reproducing styli 80 and 115 by one track pitch in the inner peripheral direction within the vertical blanking period portion a.

On the other hand, when the second kick instruction signal k2 is supplied to the kick control signal generator 119, the kick control signal generator 119 generates such a kick control signal that the kick pulse generator 100 generates kick pulses for kicking the reproducing styli 80 and 115 by one track pitch in the inner peripheral direction after approximately one field and after approximately four fields from the time when the kick control signal is received by the kick pulse generator 100.

Hence, in the simultaneous stereoscopic picture reproducing mode, the reproducing styli 80 and 115 are only kicked by one track pitch in the inner peripheral direction within the vertical blanking period portions a of the video disc 11 shown in FIG. 1. Thus, the reproduced right-eye and left-eye video signals related to identical fields are simultaneously outputted via the output terminals 90 and 118.

As is clear from the track pattern shown in FIG. 1, the right-eye and left-eye video signals coexist in each track turn of the video disc 11. By taking as a reference the point in time when the third reference signal fp3 is reproduced, in the simultaneous stereoscopic picture reproducing mode, the output terminal 90 is supplied with the reproduced right-eye video signal for a time period of one field, thereafter supplied with the reproduced left-eye video signal for a time period of two fields, thereafter supplied with the reproduced right-eye video signal for a time period of one field, and the right-eye and left-eye video signals are thereafter supplied to the output terminal 90 with this sequence with a period of four fields. A period with which the reproduced right-eye and left-eye video signals are supplied to the output terminal 118 in a predetermined sequence is also four fields.

On the other hand, in order to obtain the simultaneous stereoscopic picture, it is necessary to use two monitoring apparatuses, and a first monitoring apparatus must be used exclusively for reproducing the right-eye video signal and a second monitoring apparatus must be used exclusively for reproducing the left-eye video signal.

For this reason, the reproduced video signals from the output terminals 90 and 118 are supplied to switching means (not shown) for alternately switching the reproduced video signals in a time period of two fields from the vertical blanking period portion b to the vertical blanking period portion d and in a time period of two fields from the vertical blanking period portion d to the vertical blanking period portion a. As a result, only the reproduced right-eye video signal from the switching means is supplied to a picture tube 125 of the first monitoring apparatus via a terminal 124 shown in FIG. 15, and only the reproduced left-eye video signal from the switching means is supplied to a picture tube 127 of the second monitoring apparatus via a terminal 126 shown in FIG. 15.

In FIG. 15, polarizing plates 128 and 129 having mutually different polarizing angles are arranged in front of the respective picture tubes 125 and 127, and a semitransparent mirror 130 is arranged as shown. A viewer 131 wears polarizing glasses 132. A right-eye polarizing plate 132r of the polarizing glasses 132 has a polarizing angle identical to that of the polarizing plate 128. Similarly, a left-eye polarizing plate 132l of the polarizing glasses 132 has a polarizing angle identical to that of the polarizing plate 129.

Accordingly, only the picture of the right-eye video signal reproduced on the picture tube 125 reaches the right eye of the viewer 131 via the polarizing plate 128, the semitransparent mirror 130 and the polarizing plate 132r of the polarizing glasses 132. On the other hand, only the picture of the left-eye video signal reproduced on the picture tube 127 reaches the left eye of the viewer 131 via the polarizing plate 129, the semitransparent mirror 130 and the polarizing plate 132l of the polarizing glasses 132. As a result, the viewer 131 views the simultaneous stereoscopic picture through the polarizing glasses 132.

Next, description will be given with respect to another embodiment of the information signal recording disc according to the present invention by referring to FIG. 16. According to the present embodiment, the right-eye and left-eye video signals are alternately recorded in the sequence of the field numbers for every one field and the sequence of the alternating right-eye and left-eye video signals is reversed for every four fields, so that the video signals related to identical fields are recorded twice.

As indicated by black triangular marks in FIG. 16, the audio signals are discontinuous at an arbitrary position within a time period of approximately one field from the vertical blanking period portion a (recorded position of the third reference signal fp3) to the vertical blanking period portion b of the right-eye and left-eye video signals which are alternately recorded in a predetermined sequence with a period of eight fields.

In the two-dimensional picture reproducing mode, only the left-eye video signal is reproduced. In this case, the reproducing element is kicked by one track pitch in the inner peripheral direction within the vertical blanking period portions b and d, and further, the reproducing element is kicked by one track pitch and in the outer peripheral direction within the vertical blanking period portion c. Two kinds of kick instruction signals are recorded within the vertical blanking period portion a so as to instruct such kicks. As in the case of the first and second kick instruction signals k1 and k2 described before, the two kinds of kick instruction signals are alternately recorded with a period of four fields. Even when the reproducing element misreads one of the two kinds of kick instruction signals, the reproducing element is kicked by one track pitch in the outer peripheral direction within the vertical blanking period portion c by reproducing the other kick instruction signal, and the scanning locus of the reproducing element is returned to the correct scanning locus. However, when one of the two kinds of kick instruction signals is misread, an erroneous reproduction takes place until the scanning locus of the reproducing element is returned to the correct locus. Therefore, in order to minimize the possibility of reproducing the discontinuous points of the audio signals, it is desirable to select the positions of the discontinuous points of the audio signals to the positions indicated by the black triangular marks in FIG. 16.

According to the present embodiment, the reproducing element scans along such a scanning locus in the sequential stereoscopic picture reproducing mode that the reproducing element is kicked by one track pitch in the inner peripheral direction only within the vertical blanking period portion a.

As in the case of the video disc 11 shown in FIG. 1, it is evident from the description given heretofore that it is also possible to selectively obtain the two-dimensional picture, the simultaneous stereoscopic picture and the sequential stereoscopic picture from the video disc according to the present embodiment.

The arrangement used for obtaining the stereoscopic picture is not limited to those described heretofore, and other arrangements may be employed.

The reproducing apparatus may be designed so that in the double-speed quick motion reproducing mode thereof the reproducing element is automatically kicked by one track pitch in the inner peripheral direction within a vertical blanking period portion occurring two fields after a vertical blanking period portion where the switching of the sides of the first and second reference signals fp1 and fp2 with respect to the spiral track takes place (that is, where the third reference signal fp3 is recorded). When the video disc 11 shown in FIG. 1 is played on this reproducing apparatus in the double-speed quick motion reproducing mode, it is possible to obtain the sequential stereoscopic reproduced picture.

In the reproducing apparatus having this design, the audio signals are muted during the double-speed quick motion reproducing mode when playing a conventional information signal recording disc. Hence, it is necessary to cancel the muting of the audio signals in the double-speed quick motion reproducing mode when playing the information signal recording disc (for example, the video disc 11) according to the present invention in order to obtain reproduced sound together with the reproduced sequential stereoscopic picture.

In addition, it is possible to connect to the reproducing apparatus an adapter which is designed to generated a control signal when the first kick instruction signal k1 is reproduced from the video disc 11. In this case, the reproducing mode of the reproducing apparatus is automatically changed from the normal reproducing mode of the double-speed quick motion reproducing mode when the reproducing apparatus receives the output control signal of the adapter.

An address is assigned to each track turn of the video disc 11 described before. Hence, depending on whether the address reproduced from a track turn is an odd or even address, it is possible to discriminate whether the track turn is recorded with the kick instruction signal k1 or k2. Accordingly, the adapter described above may be designed to read only the address from the video disc 11 and generate a predetermined control signal based on the read address.

Even without the use of the adapter, the information signal recording disc according to the present invention may be played on the existing reproducing apparatus by setting the reproducing mode thereof to the double-speed quick motion reproducing mode. In this case, it is possible to correctly reproduce the sequential stereoscopic television signal from the disc with a probability of ½ depending on the track turn from which the reproduction is started.

In FIGS. 1 and 16, it is possible to interchange the recorded positions of the right-eye video signal and the left-eye video signal. Moreover, when recording the signals on the disc, the spiral track T may be formed from the inner periphery to the outer periphery of the disc.

Further, the present invention is not limited to these embodiments, but various variations and modifications may be made without departing from the scope of the present invention.

What is claimed is:

1. An information signal recording disc recorded with a stereoscopic television signal, said stereoscopic television signal comprising a stereoscopic video signal and audio signals, said information signal recording disc comprising:
   a spiral track comprising a plurality of track turns; and
   video signals related to four fields recorded on each of said plurality of track turns,
   each of said plurality of track turns comprising right-eye and left-eye video signals of mutually different field numbers out of the right-eye and left-eye video signals of a simultaneous stereoscopic television signal time-sequentially recorded in a sequence of field numbers together with audio signals so that the right-eye video signal and the left-eye video signal are respectively recorded for a time period of two fields in each of said plurality of track turns,
   two mutually adjacent track turns comprising the right-eye and left-eye video signals related to identical fields recorded side by side to each other,
   said spiral track comprising said right-eye and left-eye video signals in a predetermined sequence which is repeated with a period of eight fields.

2. An information signal recording disc as claimed in claim 1 in which said predetermined sequence is made up of one of said right-eye and left-eye video signals related to one field, the other of said right-eye and left-eye video signals related to two fields, said one video signal related to one field, said other video signal related to one field, said one video signal related to two fields, and said other video signal related to one field.

3. An information signal recording disc as claimed in claim 2 which further comprises a first kick instruction signal recorded on said spiral track within a vertical blanking period portion between a fourth field of said one video signal and a fifth field of said other video signal in said predetermined sequence and a second kick instruction signal recorded on said spiral track within a vertical blanking period portion immediately before a first field of said one video signal in said predetermined sequence, said first kick instruction signal instructing a reproducing element of a reproducing apparatus to kick by one track pitch in a backward direction approximately one field after a first reproducing point when the reproducing element reproduces said first kick instruction signal and to kick by one track pitch in a forward direction approximately three and four fields after said first reproducing point, said second kick instruction signal instructing the reproducing element to kick by one track pitch in the forward direction approximately three and foru fields after a second reproducing point when the reproducing element reproduces said second kick instruction signal.

4. An information signal recording disc as claimed in claim 2 in which a track turn part corresponding to a fourth field of said one video signal in said predetermined sequence is divided into two portions at an arbitrary position on said track turn part, a first of said two portions being recorded with audio signals related to the fourth field of said one video signal, a latter of said two portions being recorded with audio signals related to a specific field of said other video signal recorded four fields before the fourth field of said one video signal.

5. An information signal recording disc as claimed in claim 1 in which said predetermined sequence is made up of one of said right-eye and left-eye video signals related to one field, the other of said right-eye and left-eye video signals related to one field, said one video signal related to one field, said other video signal related to two fields, said one video signal related to one field, said other video signal related to one field, and said one video signal related to one field.

6. An information signal recording disc as claimed in claim 5 which further comprises a first kick instruction signal recorded on said spiral track within a vertical blanking period portion immediately before a first field of said one video signal in said predetermined sequence and a second kick instruction signal recorded on said spiral track within a vertical blanking period portion between a fourth field of said other video signal and a fifth field of said other video signal in said predetermined sequence, said first kick instruction signal instructing a reproducing element of a reproducing apparatus to kick by one track pitch in a forward direction approximately one field and three fields after a first reproducing point when the reproducing element reproduces said first kick instruction signal and to kick by one track pitch in a backward direction approximately two fields after said first reproducing point, said second kick instruction signal instructing the reproducing element to kick by one track pitch in the backward direction approximately two fields after a second reproducing point when the reproducing element reproduces said second kick instruction signal.

7. An information signal recording disc as claimed in claim 5 in which a track turn part corresponding to a fifth field of said other video signal in said predetermined sequence is divided into two portions at an arbitrary position on said track turn part, a first of said two portions being recorded with audio signal related to the fifth field of said other video signal, a latter of said two portions being recorded with audio signals related to a specific field of said one video signal recorded four fields before the fifth field of said other video signal.

* * * * *

UNITED STATES PATENT AND TRADEMARK OFFICE
CERTIFICATE OF CORRECTION

PATENT NO. : 4,739,418
DATED : April 19, 1988
INVENTOR(S) : MAKOTO IWAHARA ET AL It is certified that error appears in the above-identified patent and that said Letters Patent is hereby corrected as shown below:

| | |
|---|---|
| Column 1, line 45 | delete "braodcasting" and substitute therefor ---broadcasting-- |
| Column 9, line 34 | delete "wuch" and substitute therefor ---such--- |
| Column 16, line 16 | delete "," insert --of-- and after "apparatus" insert --. In this first embodiment, the reproducing apparatus--. |
| Column 17, line 9 | delete "pf1 and pf2," and substitute therefor ---fp1 and fp2,--- |
| Column 17, line 60 | delete "errror" and substitute therefor --error-- |
| Column 20, line 6 | delete "12b" and substitute therefor ---120b--- |
| Column 21, line 59 | delete "ina" and substitute therefor ---in a--- |

UNITED STATES PATENT AND TRADEMARK OFFICE
CERTIFICATE OF CORRECTION

PATENT NO. : 4,739,418

DATED : April 19, 1988

INVENTOR(S) : MAKOTO IWAHARA ET AL

It is certified that error appears in the above-identified patent and that said Letters Patent is hereby corrected as shown below:

Column 24, line 13    delete "foru" and substitute therefor --four--.

Column 24, line 63    delete "signal" and substitute therefor --signals--.

Signed and Sealed this

Eleventh Day of July, 1989

Attest:

DONALD J. QUIGG

*Attesting Officer*    Commissioner of Patents and Trademarks